United States Patent

[11] 3,589,232

[72] Inventor Joseph G. Peters
 334 S. Union Ave., Cranford, N.J. 07016
[21] Appl. No. 792,019
[22] Filed Jan. 17, 1969
[45] Patented June 29, 1971

[54] HARMONICA HOLE SELECTOR
 6 Claims, 3 Drawing Figs.
[52] U.S. Cl. .................................................. 84/377, 84/379
[51] Int. Cl. .................................................. G01d 7/12
[50] Field of Search .................................................. 84/377, 379, 453, 330; 46/179

[56] References Cited
UNITED STATES PATENTS
| | | | |
|---|---|---|---|
| 176,124 | 4/1876 | St. John | 84/377 |
| 922,121 | 5/1909 | Fraser | 84/377 |
| 1,637,289 | 7/1927 | Yates | 84/379 |
| 1,722,852 | 7/1929 | Miller | 84/379 |
| 2,823,570 | 2/1958 | Bacon | 84/330 |

Primary Examiner—Richard B. Wilkinson
Assistant Examiner—Lawrence R. Franklin
Attorney—Nilsson & Robbins ABSTRACT: An harmonica hole selector comprising a holder for the harmonica that is slidable thereon and which defines an opening arranged to be aligned with any one of selected openings at the front of the harmonica. An air conduit communicates with the holder opening and extends therefrom a distance at least sufficient to enable a user during use thereof to view the front of the harmonica.

PATENTED JUN 29 1971　　　3,589,232

INVENTOR.
JOSEPH G. PETERS.
BY
Nilsson & Robbins
Attorneys.

3,589,232

HARMONICA HOLE SELECTOR

BACKGROUND OF THE INVENTION

1. Field of the Invention

The field of art to which the invention pertains includes the field of harmonicas and supports and holders therefor.

2. Description of the Prior Art

In playing an harmonica notes are sounded by either blowing or drawing the breath through the several holes of the harmonica. To successfully play the instrument the performer must acquire the knack of tonguing, that is, of arranging his tongue in such manner as to direct and draw his breath through only single holes. This is a difficult and tedious task and requires long practice before it can be successfully accomplished. For children, the task is often insurmountable with the result that the child looks upon a harmonica not as an instrument with which to make music but as merely a noise-making device. A further problem that a child encounters is trying to play a harmonica is his general inability to visually associate any particular hole with a note of music. On other instruments, the child can see the portion of the instrument that he is fingering and can therefore visually correlate the physical playing of the instrument with the sound emitted both in comparison to the music. However, with a harmonica, even if the child were to master the tonguing technique he would still encounter difficulty in associating the location of any particular note on the harmonica with the note on the sheet of music. Some harmonicas are provided with numbers printed or etched in the body of the harmonica above each opening and the purchaser receives sheet music on which the notes are correspondingly numbered. Such numbering, however, is generally wasted since the child has no means of viewing the numbers during play of the harmonica.

There have been many prior attempts to alleviate the foregoing problems, for example, as disclosed in U.S. Pat. Nos. 375,608, 922,121, 1,722,852, 1,797,613 and 2,655,830. These attempts have generally provided a mouthpiece slidably arranged on a harmonica and which has a bore designed to register with the selected holes in the harmonica. While such devices greatly aid in overcoming tonguing problems, they either ignore the important problem of note location, or they attempt note location by providing pointers extending from the mouthpiece to engage note-bearing devices extending from the harmonica. The result is an unwieldy complex and expensive contraption.

SUMMARY OF THE INVENTION

The present invention provides an extremely simple and inexpensive device that is readily attachable to a harmonica of standard design to enable even a child to selectively play single notes of the harmonica in correspondence to notes on a sheet of music. This invention provides a device whereby the user is able to view the harmonica during play thereof and can visually determine the harmonica opening that he is using while he is blowing or drawing air. With the device of this invention, a child can readily learn to associate particular notes on the harmonica with the sounds made thereby and with the corresponding notes on a sheet of music. The device herein is also useful as an amusement device giving many hours of enjoyment as a plaything, even for a very small child. In this respect, means are provided in the present invention for the sanitary use of the device whereby ordinary disposable drinking straws can be utilized as mouthpieces.

In accordance with this invention, a device is provided for aiding in selectively playing the notes of a harmonica and comprises a holder adapted to be associated with a harmonica so as to be operatively moveable with respect thereto and defining an opening arranged to be aligned with any one of selected openings in the front of the harmonica. An air conduit is provided communicating with the holder opening and extending therefrom a distance at least sufficient to enable the user during use thereof to view the front of the harmonica. In particular embodiments, a straw may be disposed in the conduit extending from the end of the conduit opposite from the holder opening. In other embodiments, the holder is either transparent or otherwise defines a window arranged to overlie note designations above the harmonica openings so as to uncover a note designation in correspondence to the position of the holder opening with respect to the harmonica openings. In still other embodiments, a resiliently deformable member is disposed between the harmonica and the holder for facilitating securement of the harmonica in the holder, but allowing slidable movement thereof. The resiliently deformable member can be disposed between the front of the harmonica and the region of the holder that defines the opening therein, the deformable member defining an opening aligned with the holder opening. In yet other embodiments the holder can include a member extending downwardly therefrom and shaped to serve as a fingerhold.

DESCRIPTION OF THE PREFERRED EMBODIMENTS

Figure 1:
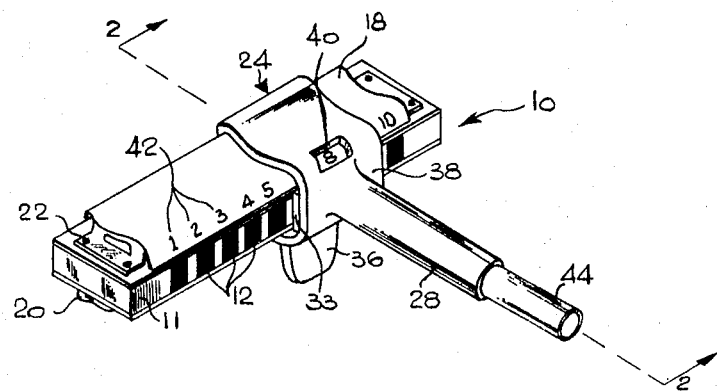
FIG. 1 is a perspective view of the holder of this invention slidably disposed on a harmonica.

Referring to the FIGS., a harmonica 10 is shown of the usual construction having a body 11 provided with the usual holes 12 in which are arranged the usual top and bottom rows of reeds 14 and 16, respectively. Each top reed 14 sounds a note when the user forces his breath through that hole and each bottom reed 16 sounds a note when the user draws his breath through the hole thereat. Top and bottom faceplates 18 and 20, respectively, are secured to the body 11 by means of small screws 22 therein. The faceplates 18 and 20 provide coverings for the movement of the reeds 14 and 16, respectively.

Figure 2:
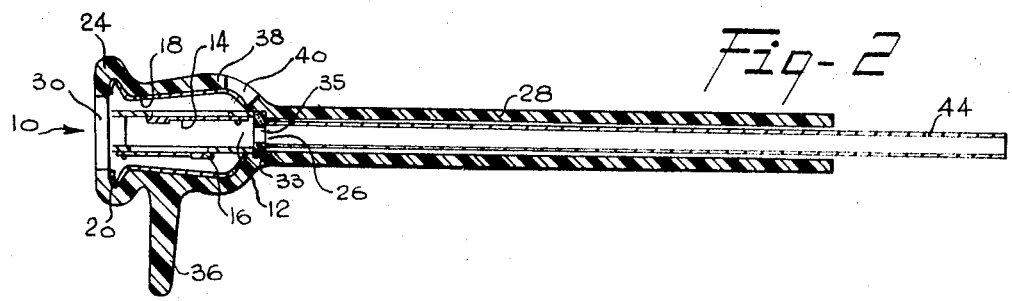
FIG. 2 is a sectional view on the line 2—2 of FIG. 1, in the direction of the arrows.

A selecting device or holder 24 is provided, and as shown in detail in FIG. 2, is formed of plastic or the like to conform to a cross-sectional contour of the harmonica and is arranged for easy sliding movement upon the harmonica when associated therewith. The holder 24 is provided with an opening 26 for selective alignment with any one of the openings 12 in the front of the harmonica 10. An air conduit 28 is formed integral with the holder 24 and communicates with the holder opening 26.

Figure 3:
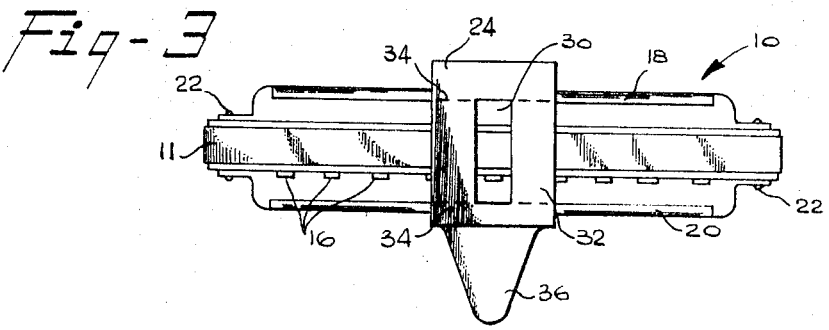
FIG. 3 is a rear plan view of the device of FIG. 1.

With particular reference to FIG. 3, the holder 24 defines an additional opening 30 on the rear wall 32 thereof. The rear opening 30 is not essential to operation of the harmonica since air escape and intake is allowed by the open design of the faceplates 18 and 20; however, the hole 30 does facilitate the flow of air over the reeds 14 and 16. In place of the hole 30, one can design the holder 24 so as to enclose the faceplates 18 and 20 without bridging the back of the harmonica 10, as shown by the dashed lines 34 in FIG. 3.

The holder 24 is formed with an extended member 36 downwardly from the bottom thereof to serve as a fingerhold. Referring particularly to FIGS. 1 and 2, the holder 24 is also provided internally thereof with a resiliently deformable member 33 abutting the opening 26 so as to be disposed between the front of the harmonica 10 and the holder opening 26 and which defines an opening 35 therein (FIG. 2) aligned with the holder opening 26. The deformable member 33 facilitates securement of the harmonica 10 in the holder 24 but allows slidable movement therethrough. More importantly, the deformable member 33 seals the air passage between the harmonica opening 26 and the air conduit 28 to facilitate play when drawing air through the device. The deformable member 33 can be cut to shape from foam rubber sheeting or the like with the hole 35 punched therethrough and glued in position to the holder 24.

The front portion of the top wall 38 of the holder 24 defines a window 40 therethrough. The top faceplate 18 of the harmonica 10 is provided with a series of numbers 42 engraved thereon over the reed openings 12, which numbers designate corresponding music notes. The window 40 formed in the holder 24 is arranged to overlie the note designations 42 so as to uncover a note designation corresponding to the position of the holder opening 26 with respect to the harmonica openings 12. Upon sliding movement of the holder 24 with respect to the harmonica 10, the note designations 42 are sequentially uncovered. Alternatively the holder 24 can be sufficiently transparent at least in the vicinity of the window 40 to enable the note designations 42 on the harmonica to be viewed therethrough.

The air conduit 28 extends from the air opening 26 in the holder 24 a distance at least sufficient to enable a user during use thereof to view the front of the harmonica. By such means, the user is enabled to visually determine the opening through which air is being blown or drawn. Generally, with respect to the width front-to-back of the harmonica 10, the length of the conduit 28 is 1½ the width of the harmonica or longer.

In order to enable sanitary use of the device, particularly where more than one person would be using the harmonica holder 24, an ordinary drinking straw 44 can be inserted in the air conduit, as shown in FIGS. 1 and 2, to provide a disposable mouthpiece for the holder 24. The straw is inserted until it abuts the deformable member 33 and in such position extends somewhat beyond the outer edge of the air conduit 28. It will be appreciated that if the holder 24 is designed to be utilized with a straw 44 insert, the conduit 28 can be formed with a length shorter than the dimension given above since the straw can extend to that length. However, even in this case, the conduit 28 should have a length at least equal to the width of the harmonica 10 so as to provide a firm support for the straw 44. It should also be noted that the foregoing dimensions are approximate and are set forth as a convenient designation of dimensions. Optimum dimensions would, of course, depend upon the user and whether he is a child or an adult. Further, longer sizes for the air conduit 28 are often more convenient and more desirable. The dimensions, with respect to the size of the harmonica as actually shown in FIG. 2, are found to be quite desirable and convenient and represent a length of about 4 inches from the front of the harmonica 10 to the outer end of the air conduit 28.

In operation, a harmonica 10 of appropriate size is inserted within the holder 24 and a disposable straw 44 is inserted within the air conduit 28. By grasping the harmonica 10 with one hand and the fingerhold 36 of the holder 24 with the other hand, one can slide the harmonica 10 within the holder 24 while blowing or drawing air through the straw 44 to selectively sound any desired note. The note that is being sounded will be indicated by the number designation thereof in the window 40.

What I claim is:

1. A device for aiding in selectively playing the notes of a harmonica, which has note designations thereon, comprising, in combination:

a holder adapted to be associated with a harmonica so as to be operatively movable with respect thereto and defining an opening arranged to be aligned upon said operative movement with any one of selected openings in the front of said harmonica, said holder defining a window arranged to overlie said note designations so as to uncover a note designation in correspondence to the position of said holder opening with respect to said harmonica openings;

an air conduit communicating with said holder opening and extending in line with said opening whereby to project from the front of said harmonica, said conduit being shaped to accommodate removable mouthpiece tubing therein; and mouthpiece tubing removably disposed in said air conduit whereby during use of said device, air may be directed by a user through said tubing, into a selected opening in the front of said harmonica, said tubing extending a distance from said holder opening at least sufficient to enable a user during use thereof to view the front of said harmonica.

2. The device of claim 1 wherein said holder is slidably disposed on said harmonica.

3. The device of claim 1 including a resiliently deformable member disposed between said harmonica and said holder for facilitating securement of said harmonica in said holder but allowing said operative movement.

4. The device of claim 1 including a resiliently deformable member disposed between the front of said harmonica and the region of said holder that defines said opening, said deformable member defining an opening aligned with said holder.

5. The device of claim 1 including a member shaped to serve as a fingerhold for said holder extending downwardly from the bottom of said holder.

6. The device of claim 1 wherein said holder is shaped to extend across the width of said harmonica and the length of said conduit is at least 1½ said width.